Patented June 10, 1930

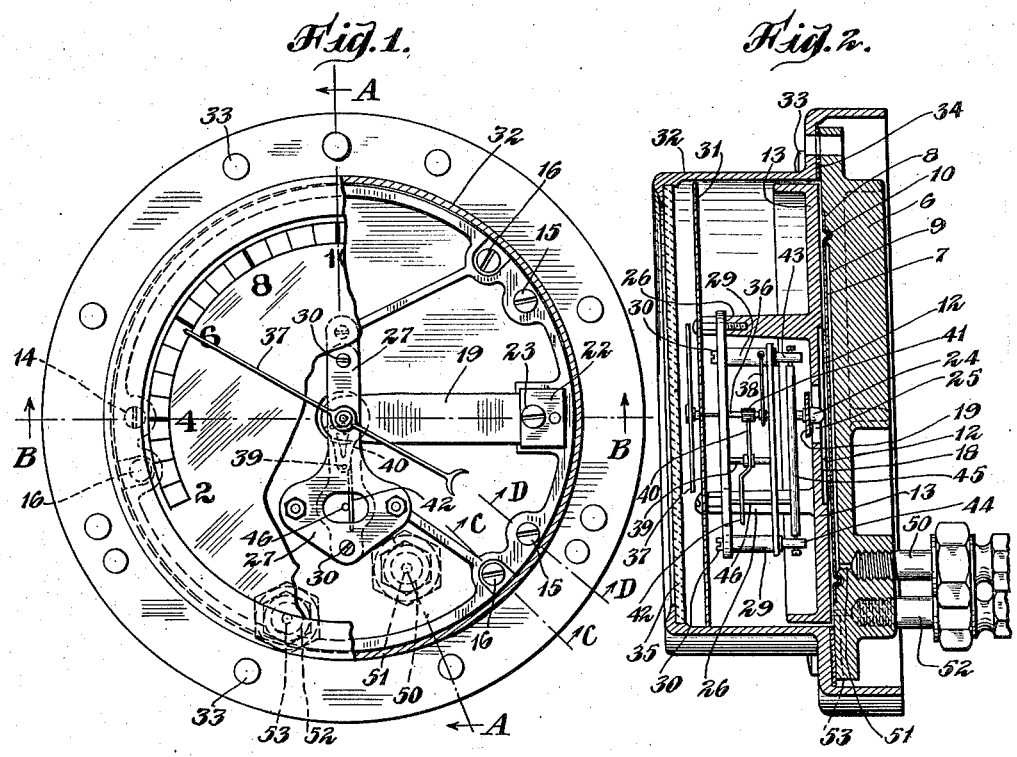
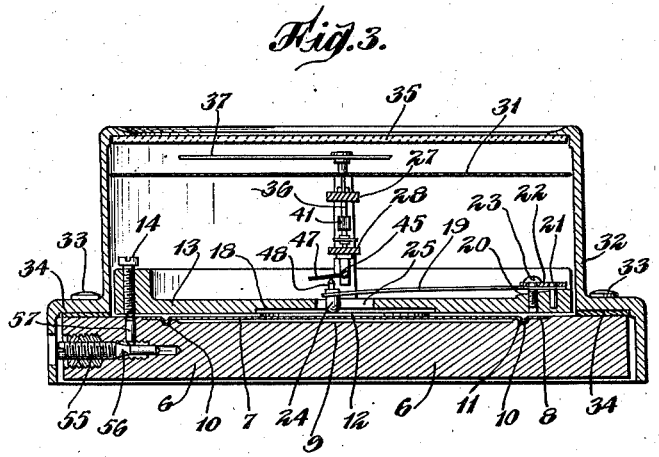
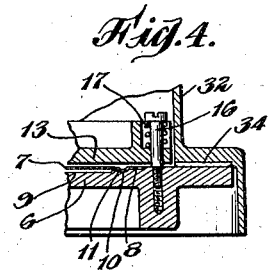
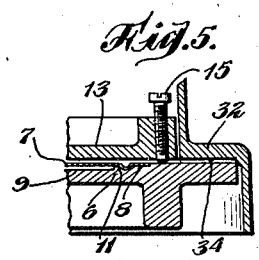

1,763,354

UNITED STATES PATENT OFFICE

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE

PRESSURE GAUGE

Application filed May 21, 1926. Serial No. 110,599.

My invention relates to improvements in pressure operated mechanism and more particularly to pressure gauges adapted to give accurate indications for comparatively low pressures or low differences in pressures. The main object of the invention is to provide a gauge which is not only simple and efficient in construction but also one which is less likely to get out of order and one which is easily and readily adjusted.

Further and more specific objects, features and advantages will more clearly appear from the detail description given below taken in connection with the accompanying sheet of drawings which illustrate a gauge embodying my improvements in a preferred form thereof.

In the drawings, Fig. 1 is a plan view of the gauge partly in section in order to more clearly illustrate the same. Fig. 2 is a vertical section taken on the line A—A of Fig. 1. Fig. 3 is a transverse section taken on the line B—B of Fig. 1. Fig. 4 is a transverse section taken on the line C—C of Fig. 1, and Fig. 5 is a transverse section taken on the line D—D of Fig. 1.

Referring to the drawings, 6 represents a part of the framework comprising a base plate for holding a pressure operated diaphragm 7. The diaphragm 7 consists of a thin sheet of metal circular in shape and soldered into a rabbeted portion of the plate 6 around the periphery as at 8. Underneath the diaphragm 7 the plate 6 is recessed at 9 so as to provide a shallow recess of predetermined depth underneath the diaphragm when the latter is in its normal position as shown on the drawings. Around the recess 9, plate 6 is provided with a circular groove 10 and between the groove 10 and recess 9 plate 6 is provided with a circular ridge 11. The diaphragm 7 is preferably applied to the plate 6 by taking a flat circular sheet of the metal and soldering the edges to the plate 6 as at 8. Thereupon a die provided with a ridge adapted to fit or cooperate with the groove 10 is pressed down upon the diaphragm and plate thus forcing the metal of the diaphragm into the groove 10. This causes the diaphragm to be stretched and tensioned over the circular ridge 11. Thereafter air may be introduced under pressure into the space between the diaphragm and plate 6 to move the diaphragm through its operative range and condition the same as described in my co-pending application Ser. No. 110,599 filed May 21, 1926.

The diaphragm 7 has secured to its center a thin metal disc 12 and arranged above the diaphragm 7 and disc 12 is a plate 13, which plate has screw-threaded in its periphery screws 14 and 15, which serve to adjustably space the plate 13 from the plate 6 and diaphragm 7. There are also provided screws 16 passing freely through the plate 13 at its edge and screw-threaded into the plate 6. Coil springs 17 surround the screws 16 between the heads thereof and the plate 13 whereby the springs 17 tend to force the plate 13 toward the plate 6 and resiliently hold the screws 14 and 15 firmly against the plate 6. By turning the screws 14 and 15 the plate 13 may be adjusted toward and from the plate 6 and diaphragm 7 so that the space between the diaphragm 7 and plate 13 may be thus easily adjusted. The plate 13 is provided with a shallow circular recess at 18 to accommodate the thin disc 12 on the diaphragm 7.

19 represents a leaf spring fulcrummed on a bevel portion 20 of the plate 13 at 21. 22 represents a metal plate on the outer end of the spring 19 and a screw 23 passes loosely through the plate 22 and spring 19 and is screw-threaded into the plate 13 whereby upon turning the screw 23 the tension exerted by the spring 19 may be easily adjusted. At its inner end adjacent the center part of the diaphragm 7 the spring 19 has secured to its underneath side a button 24 which bears against the plate 12 on the diaphragm 7. The button 24 passes through central aperture 25 in the plate 13 and when the parts are in position for operation, tension of the spring 19 is so adjusted by operation of screw 23 that it will force the central portion of the diaphragm 7 down substantially to the bottom of the recess 9. In Figs. 2 and 3 of the drawings, the diaphragm, however, is shown in its normal position, the spring 19 not forcing it down into the recess 9.

The plate 13 is provided with integral posts 26 to which is secured framework comprising upper plate 27 and lower plate 28 secured together by spacers 29 and screws 30. A suitable dial 31 is secured to the top of the posts 26. Surrounding the whole is a cylindrical casing member 32 secured to the base plate 6 by means of screws or bolts 33, around the periphery of the base plate, a packing 34 being inserted between the two in order to provide a substantially air or pressure tight joint. The casing 32 is provided with a transparent glass 35 securely sealed in the front end of the casing so that the interior of the casing is made air or pressure tight.

Journaled in the framework 27 and 28 is a spindle 36 which passes through the dial 31 and has secured on its outer end an indicating pointer 37. A coil hair spring 38 having its inner end secured to the spindle 36 and its outer end secured to the frame member 29 normally tends to return the pointer 37 to its zero position and also take up backlash in the movement. Journaled on a post at 39 is a segment 40 meshing with a gear 41 on the spindle 36. On the other side of the shaft 39 the segment 40 is provided with a laterally extending arm 42. Journaled in the framework at 43 and 44 is a lever member 45 having an upwardly extending arm 46 adapted to engage the arm 42 on the segment 40. The lever 45 is also provided with a laterally extending arm 47 extending substantially parallel with the diaphragm 7 and plate 13 and adapted to be engaged by knife edge 48 secured to and carried by the inner end of the leaf spring 19 adjacent the central part of the diaphragm. 50 represents a connection whereby air or other fluid under pressure may be introduced through hole 51 to the space or closed chamber on the underneath side of the diaphragm between it and the plate 6. 52 represents a similar connection whereby air or other fluid under pressure may be introduced into the space or closed chamber on the other side of the diaphragm through a hole 53.

When only one pressure and not difference in pressure, is to be measured, the pressure is exerted through the connection 50 and causes the diaphragm to be raised against the action of the spring 19 whereupon the button 24 and knife edge 48 are raised as viewed in Fig. 3, causing the arm 47 of the lever 45 to be raised slightly whereupon the arm 46 of the lever causes a slight oscillation of the arm 42 on the segment 40, which rotates the gear 41 causing rotation of the pointer 37 responsive to and in an amount corresponding to the pressure applied whereby the pressure is measured or indicated. If difference in pressures is to be measured then the greater pressure is applied through the connection 50 while the lesser pressure is applied through the connection 52 to the upper side of the diaphragm as viewed in Fig. 3 whereupon the movement of the diaphragm will be controlled by and responsive to the difference between said pressures. And wherever I refer to the pressure being applied to the diaphragm or the one side of the diaphragm, I include also the operation by such differential pressure. Thus in operation the diaphragm 7 is, when no fluid pressure is applied thereto, maintained on one side of its normal position by the spring 19 and when operated by pressure to be measured is moved back to its normal position and even to the other side of its normal position against the action of the spring 19.

Should for any reason the pressure applied to the diaphragm be greater than that for which the apparatus was intended the diaphragm will come against the plate 13 which acts as a stop therefor and thus prevents such excessive pressure from operating the indicating mechanism beyond the range for which it was designed and so injuring the same. Likewise in measuring differential pressures, should for any reason the flow of fluid through the connection 50 be stopped while permitting high pressure to be exerted through the connection 52, then an excessive pressure would be applied to the diaphragm 7 on the opposite side thereof, but is prevented from doing injury thereto because the surface of the recess 9 in the plate 6 acts as a stop for any excessive movement of the diaphragm in this direction. I find that by using a spring such as the leaf spring 19, acting on the diaphragm in opposition to the pressure being measured, that the instrument becomes much more reliable and satisfactory in operation.

In order that the range of movement of the pointer may be adjusted for any given range of movement of the diaphragm, it is only necessary to move the spring 19 laterally over the diaphragm slightly so that the knife edge 48 will be moved toward or from the axis of the lever 45. For this purpose the leaf spring 19 is slotted on its outer end and the screw 23 and pivot pin 21 pass through such slot so that by loosening the screw 23 the spring 19 may be moved over the diaphragm in a direction substantially parallel thereto so that the knife edge 48 will engage the lever arm 47 at a greater or less distance from the axis of the lever and thus any given movement of the diaphragm will produce a less or greater movement of the indicating point 37. Also by adjusting the tension on the spring by turning the screw 23, the extent of motion of the diaphragm for any given pressure may be varied. Since the indicating mechanism is carried by the plate 13, the zero position of the pointer may be adjusted by simply moving the plate 13 toward or from the plate 6 and diaphragm 7. Thus by simply raising the plate 13 as viewed in Fig. 3 by operation of the screws 14 and 15, the spring 19 which causes the button 24 to be pressed against the diaphragm will drop with respect to the lever arm 47 thus permitting the lever arm 47 to rotate slightly and bring the indicating pointer to any desired position. In order that such adjustment may be made without removing the casing 42 and while pressure is being applied to the inside of the casing, I have shown in Fig. 3 a screw-threaded member 55 screw-threaded into the side or edge of the plate 6 and provided with a beveled portion at 56 adapted to engage a plunger 57 freely movable in a hole underneath the screw 14 whereby by screwing in the screw 55 the bevel 56 will engage plunger 57 and cause the same to be raised as viewed in Fig. 3, thus engaging the screw 14 and raising the plate 13 on one side thereof which causes the knife edge 48 to be moved down under the action of the spring 19, with respect to the lever 45 and so bring about the desired adjustment of the pointer 37. By unscrewing the screw 55 adjustment may be made in the opposite direction. It will be understood that when the apparatus is ready for operation and with no pressure applied, that the spring 19 will cause the diaphragm to assume a convex shape extending into the recess 9, and when the pressure to be measured is applied, the spring controls the extent of motion of the diaphragm for any given pressure, and if the pressure applied is sufficient the diaphragm will be moved back to its normal position or beyond to assume a convex shape. But the diaphragm is limited in its movement in both directions by the plates 6 and 13 respectively so that it and the indicating mechanism cannot be damaged by the application of excessive pressure. I find that in such an apparatus a diaphragm having a substantially flat, plane and non-corrugated surface gives excellent results and especially when stretched in position and conditioned as described.

While I have described my improvements in great detail and with respect to a preferred form thereof, I do not desire to be limited to such details or form since many changes and modifications may be made and the invention embodied in widely different forms without departing from the spirit and scope thereof in its broader aspects; hence I desire to cover all modifications and forms coming within the language or scope of any one or more of the appended claims.

What I claim as new and desire to secure by Letters Patent is:

1. A pressure gauge having in combination a diaphragm, means holding the diaphragm and applying pressure to be measured to one side of the diaphragm, a frame on the other side of the diaphragm, indicating mechanism carried by said frame and operated by the diaphragm responsive to variations in the pressure applied thereto, and means for adjusting the position of said frame toward and from said holding means and diaphragm to adjust the reading of the indicating mechanism.

2. A pressure gauge having in combination a diaphragm, means holding the diaphragm and applying pressure to be measured to one side of the diaphragm, a frame on the other side of the diaphragm, indicating mechanism carried by said frame and operated by the diaphragm responsive to variations in the pressure applied thereto, and means for adjusting the position of said frame toward and from said holding means and diaphragm to adjust the reading of the indicating mechanism, and a spring carried by said holding means and acting on said diaphragm in opposition to said pressure.

3. A pressure gauge having in combination a diaphragm, means holding the diaphragm and applying pressure to be measured to one side of the diaphragm, a plate on the other side of the diaphragm, indicating mechanism carried by said plate and operated by the diaphragm responsive to variations in the pressure applied thereto, and means for adjusting the position of said plate toward and from said holding means and diaphragm to adjust the reading of the indicating mechanism, said plate carrying a surface acting as a stop for the diaphragm to prevent excessive pressure from injuring the indicating mechanism.

4. A pressure gauge having a combination a diaphragm, means holding the diaphragm and applying pressure to be measured to one side of the diaphragm, a plate on the other side of the diaphragm, indicating mechanism carried by said plate and operated by the diaphragm responsive to variations in the pressure applied thereto, means for adjusting the position of said plate toward and from said holding means and diaphragm to adjust the reading of the indicating mechanism, said plate carrying a surface acting as a stop for the diaphragm to prevent excessive pressure from injuring the indicating mechanism, and a spring carried by said holding means and acting on said diaphragm in opposition to said pressure.

5. A pressure gauge having in combination a diaphragm, means holding the diaphragm and applying fluid under pressure to both sides thereof, indicating mechanism operated by the diaphragm, a casing enclosing said indicating mechanism and confining the fluid under pressure on one side of the diaphragm, and means operable from the outside of said casing for adjusting the reading of the indicating mechanism without relieving the pressure of the fluid confined by the casing.

6. A pressure gauge having in combination a diaphragm, means holding the diaphragm and applying fluid under pressure to both sides thereof, a frame carried by said means, indicating mechanism carried by said frame and operated by the diaphragm, a casing enclosing said indicating mechanism and confining the fluid under pressure on one side of the diaphragm, and means operable from the outside of said casing for adjusting the position of the frame and indicating mechanism toward and from the holding means to adjust the reading of the indicating mechanism without relieving the pressure of the fluid confined by the casing.

7. A pressure gauge having in combination, a diaphragm, means for applying pressure to be measured to said diaphragm, said diaphragm having a substantially flat and non-corrugated surface, a leaf spring acting on said diaphragm at the central part thereof in opposition to said pressure, means carried by the gauge whereby the pressure exerted by the spring on the diaphragm may be adjusted, said spring acting to move the diaphragm to one side of its normal plane when unopposed by said pressure, said pressure acting to move the diaphragm back to its normal plane, indicating mechanism operated by said diaphragm responsive to variations in the pressure applied thereto, and means having relatively fixed surfaces, one on each side of the diaphragm and positioned to limit its movement in each direction.

8. A pressure gauge having in combination a diaphragm, means holding the diaphragm and forming closed chambers one on each side of the diaphragm, means whereby fluid under pressure may be introduced into one of said chambers, and means whereby fluid under pressure may be introduced into the other of said chambers, whereby different fluid pressures are applied to the opposite sides of said diaphragm, and indicating mechanism operated by the diaphragm for indicating the difference in pressure on opposite sides of the diaphragm, said holding means having a surface on the side of the diaphragm opposite that to which the high pressure is applied and acting as a stop for the diaphragm should excessive pressure be applied to the diaphragm acting to force it in that direction.

9. A pressure gauge having in combination a diaphragm, means holding the diaphragm and forming closed chambers one on each side of the diaphragm, means whereby fluid under pressure may be introduced into one of said chambers, and means whereby fluid under pressure may be introduced into the other of said chambers, whereby different fluid pressures are applied to the opposite sides of said diaphragm, a spring acting to force said diaphragm toward the high fluid pressure side when no fluid pressures are applied, and indicating mechanism operated by the diaphragm for indicating the difference in pressure on opposite sides of the diaphragm, said holding means having a surface on the side of the diaphragm opposite that to which the high pressure is applied and acting as a stop for the diaphragm should excessive pressure be applied to the diaphragm.

In testimony whereof I have signed my name to this specification.

EMIL A. ILEMAN.